Nov. 14, 1944.  D. F. SKLAR  2,362,941
PENETRATOR CHUCK RETAINER
Filed Nov. 26, 1943
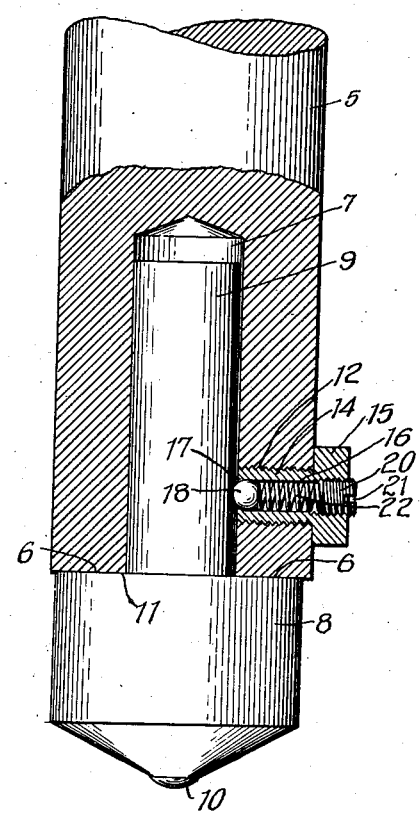
INVENTOR
DAVID F. SKLAR
BY
H. M. Kilpatrick
ATTORNEY Patented Nov. 14, 1944

2,362,941

UNITED STATES PATENT OFFICE 2,362,941

PENETRATOR CHUCK RETAINER

David F. Sklar, Brooklyn, N. Y., assignor to Wilson Mechanical Instrument Co., Inc., New York, N. Y., a corporation of New York Application November 26, 1943, Serial No. 511,793

15 Claims. (Cl. 73—85)

This invention relates to hardness testers and more particularly to penetrator chucks or holders for hardness testers of the "Rockwell" type or other types or as shown in the Wilson Patent No. 1,885,972, issued November 1, 1932.

In hardness testers of the type indicated sometimes a ball penetrator and sometimes a diamond penetrator are used. These are mounted in chucks which, in turn, are fastened into the bottom of the plunger rod of the hardness tester. In a "Rockwell" hardness tester one point of hardness is equivalent to a difference in depth of indentation of 80 millionths of an inch and, in the case of the "Rockwell" superficial tester, 40 millionths of an inch. If the penetrator chuck doesn't fit so well all the way around that one cannot, with a pocket glass, see light between the bottom of the plunger rod and the shoulder of the penetrator chuck, the readings are slightly in error, perhaps as much as one or two divisions in the dial, which is a greater error than should be tolerated.

It is very difficult to make the shoulder of the chuck, the shank of the chuck, the bottom of the plunger rod and the hole in the plunger rod all perfect, and the set screw which applicant has tried for clamping the penetrator chuck in place and which was located in the tapped hole near the bottom of the plunger rod, tends to push the shank of the penetrator chuck against the opposite side of the bore. If there is any slight conical surface to the shank of the penetrator chuck, it tends to tilt the penetrator chuck so that one can see light between the shoulder of that chuck and the bottom of the plunger rod, which is not permissible.

Objects of the invention are to provide improved means for seating the penetrator chuck accurately and which will allow easy removal, replacement and interchange of the chucks.

Other objects of the invention are to provide means of this kind which require a minimum of accurate machining to effect accuracy in the results.

Additional objects of the invention are to effect simplicity and efficiency in such devices and to provide an extremely simple device or apparatus of this kind which is economical, durable, accurate, convenient and reliable in operation, and economical to manufacture and easy to install and interchange.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein, briefly stated, in connection with the lower part of a hardness tester plunger having a right angularly transverse lower face, and an axial cylindrical bore in which is received the shank of a penetrator chuck having a body carrying a penetrator engageable with a test piece during operation of the hardness tester. Said body has an upper shoulder face also right angularly transverse to the axis of the plunger and engageable flat against said lower face. The plunger is shown as having a radial threaded bore intermediately communicating with the axial bore and receiving the threaded stem of a clamp screw having a head exteriorly engageable with the plunger, and an axial bore provided at its inner end with an interior ledge. A ball is loosely received in the screw bore against said ledge and engageable with the shank between which and a plug in the outer end of the screw bore a spring is compressed to yieldably press the ball against the shank.

After trying out various forms of yieldable means for holding the chuck in place, applicant developed and prefers the special form of clamp screw which has a ball mounted in the end as above indicated.

With this, one is able to easily take the penetrator chuck in and out and yet have it always clamped when the penetrator chuck is in testing position; but it is held there with only a light force so that, when the load is applied to the penetrator, the shoulder of the penetrator chuck seats firmly against the bottom of the plunger rod.

The scope of the invention is not limited to the specific device shown but as claimed in the broader claims, is broad enough to include other devices that bring a lateral spring pressure against the stem of the penetrator or that loosely or yieldably hold the chuck in place.

In the device shown it is important that the spring pressure be sufficient to hold the penetrator in position before the minor load is applied and yet not so strong as to make it oppose the efforts of that load to give the penetrator chuck a proper seating as determined by its shoulder and not by its shank.

In the accompanying drawing showing, by way of example one of many possible embodiments of the invention, the figure is an axial vertical sectional view partly in elevation, showing the improved chuck holding means holding the chuck in the plunger of a hardness tester.

Referring more particularly to the drawing, the chuck is shown in combination with a hardness tester machine plunger 5 having a wide flat lower face 6 at all parts lying in an accurate plane preferably accurately perpendicular to the axis and path of movement of the plunger when the indentor engages the test piece, the plunger having a substantially cylindrical bore 7 preferably substantially perpendicular to, and intersecting said face 6.

The penetrator chuck comprises a chuck body 8 provided with a cylindrical shank 9 engageable in said bore with an easy or loose fit, said body carrying at its lower part a penetrator point or ball 10 coaxial with the shank 9. Said body 8 has an upper shoulder face 11 accurately perpendicular to the axis of the plunger and engageable flat with an accurate fit against said lower face 6 of the plunger.

Said plunger has at an intermediate part of the bore 7, a radial threaded bore 12 communicating with the bore 7 and extending to the exterior of the plunger and receiving a screw 14, 15 having a threaded stem 14 engaged in said threaded bore 12, and an outer head 15 engageable with the plunger 5 to limit inward movement of the screw against clamping contact with the chuck shank 9.

Said screw has an axial bore 16 extending therethrough and provided at its extreme inner end with a reduced diameter portion forming a narrow ledge 17 against which is received a ball 18 loosely received in the bore 16 of the screw and having a diameter slightly larger than the smallest diameter of the ledge 17, whereby said ball may be retained in the screw bore resting against said ledge and adapted to project from the screw bore into engagement with the chuck shank 9.

A screw plug 20 is adjustably received in the outer end of the screw bore and provided with a transverse tool receiving slot 21 in its outer end. A spring 22, compressed between said ball and plug, is of such strength that the ball will be pressed against the chuck shank 9 with a force sufficiently strong to hold the shank in the plunger bore when the plunger is raised and before the minor load is applied and sufficiently yieldable to allow the chuck, during penetration of the point, to assume a position with its shoulder face 11 seated accurately flat against said lower face 6 of the plunger and therefore perpendicular to the axis of the plunger.

The operation of the chuck with its holding means is obvious. The proper chuck is selected and merely put in place as in the drawing, where it will be held in place by the pressure of the ball and the friction of the shank in the bore. The chuck will thus be held in place when the plunger is rising or is in raised position in which raised position accurate contact between the faces 6 and 11 is not important. However, when the plunger is forced down during penetration, should there be any inaccuracy in the faces of the bore 7 and shank 9, the spring 22 will merely yield sufficiently to allow the shank to take such a position in the bore as will allow the face 11 to engage the face 6 with absolute accuracy.

The invention claimed is:

1. In combination, a hardness-tester penetrator supporting member having a flat face adapted to be disposed to face a test piece; a carrier having a flat face disposable against said first named face and carrying a penetrator opposing the test piece; and means yieldably holding said carrier with said faces substantially adjacent, and adapted and constructed to allow lateral movement of the carrier and to allow during penetration flat contact between said faces.

2. In combination, a hardness-tester penetrator-supporting member having a flat face substantially perpendicular to the path of the member, the member having a bore substantially longitudinal to the path; a chuck having a body carrying a penetrator and a shank engageable in said bore with a loose fit; said body having a shoulder face engageable flat against said flat face when the shank is in the loose; and means to hold the chuck in place strongly enough to hold the shank in the bore when the penetrator is disengaged from the test piece and sufficiently yieldable to allow the shoulder face, during penetration to engage accurately flat against said flat face.

3. In combination, a hardness-tester load member having a flat face substantially perpendicular to the path of the member, the member having a bore substantially longitudinal to the path; a chuck having a body carrying a penetrator and a shank engageable in said bore with a loose fit; said body having a shoulder face engageable flat against said flat face when the shank is in the loose; means in said member providing a radial bore intermediately communicating with the first named bore, said radial bore being provided at its extreme inner end with an inner ledge; a ball loosely received in the radial bore against said ledge and engageable with the shank; a plug in the outer end of the radial bore; and a spring between said ball and plug and strong enough to hold the shank in the bore of the member and sufficiently yieldable to allow the shoulder face, during penetration of the pentrator, to engage accurately flat against said flat face.

4. In combination, a hardness-tester plunger having a right angularly transverse lower face and an axial cylindrical bore; a penetrator chuck carrying a penetrator and a cylindrical shank engageable in said bore with an easy loose fit; said body having an upper shoulder face right angularly transverse to the axis of the plunger and engageable flat against said lower face; said plunger having a radial threaded bore intermediately communicating with the axial bore; a screw having a threaded stem engaged in said threaded bore, and an outer head engageable with the plunger to limit the screw against clamping contact with the chuck shank; said screw having an axial bore extending therethrough and provided at its extreme inner end with a reduced diameter portion forming a narrow ledge; a ball loosely received in the bore of the screw and having a diameter slightly larger than the smallest diameter of the ledge; said ball resting against said ledge and adapted to project from the screw into engagement with the chuck shank; a screw plug adjustably received in the outer end of the screw bore and provided with a transverse tool receiving slot in its outer end; and a spring, compressed between said ball and plug, of such a strength that the ball will be pressed against the chuck shank with a force sufficiently strong to hold the shank in the plunger bore when the plunger is raised and sufficiently yieldable to allow the chuck, during penetration of the point, to assume a position with its shoulder face accurately flat against said lower face of the plunger.

5. In a hardness-tester a supporting member adapted to be opposed to a test piece for relative movement between the piece and member, said member having a substantially flat face adapted to be disposed to face the test piece transverse to the path of relative movement; a carrier member having a substantially flat face disposable near, and adapted to be disposed flat against, said first named flat face and carrying a test part opposing the test piece; and means engaging both of said members and yieldably holding said members with said flat faces substantially adjacent, and adapted to allow said members during testing to assume a relative position, determined only by the planes of said flat faces, allowing firm flat contact between said faces.

6. In a hardness-tester as in claim 5 said means being constructed and adapted to allow lateral movement between said members.

7. In a hardness-tester as in claim 5, said means being constructed and adapted to allow angular movement between said planes before said position is reached.

8. In a hardness-tester as in claim 5 said means being constructed and adapted to yieldably hold said carrier with substantially equal force at said relative position and various closely adjacent distances from the supporting member.

9. In a hardness-tester as in claim 5, said means being constructed and adapted when assuming said relative position to allow lateral and longitudinal relative movement of the members and relative angular movement of said planes, eliminating the necessity of precision accuracy of said means.

10. In a hardness-tester as in claim 5 the distances between said test part and planes being substantially less than the effective diameter of the members at said planes.

11. In a hardness-tester a supporting member adapted to be opposed to a test piece for relative movement between the piece and member, said member having a flat face adapted to be disposed to face the test piece substantially perpendicular to the path of relative movement; a carrier member having a flat face disposable, near and adapted to be disposed flat against, said first named flat face and carrying a test part opposing the test piece; and means engaging one of said members and yieldably holding said carrier member with said flat faces substantially adjacent, and adapted before and during testing to allow lateral movement of said members.

12. In a hardness-tester as in claim 11 said means being constructed and adapted to allow said members during testing to assume a relative position determined only by the planes of said faces allowing firm flat contact between said faces.

13. In a hardness-tester as in claim 11, the distance between the test part and said faces being substantially less than the effective diameter of said members at said faces.

14. In a hardness-tester a supporting member adapted to be opposed to a test piece for relative movement between the piece and member, said member having a flat face adapted to be disposed to face the test piece substantially perpendicular to the path of relative movement; a carrier member having a flat face disposable near, and adapted to be disposed flat against, said first named flat face and carrying a test part opposing the test piece; and means engaging both of said members and frictionally holding said carrier member with said flat faces substantially adjacent to each other, and adapted before and during penetration to allow lateral, angular and longitudinal movement of said members and to allow said members during testing to assume a position determined only by the planes of said faces and allowing firm flat contact between said faces.

15. In a hardness-tester as in claim 14 the distance between the testing part and said faces being substantially less than the effective diameter of said members at said faces to facilitate automatic adjustment at said planes.

DAVID F. SKLAR.